No. 648,513. Patented May 1, 1900.
L. S. MANNING.
BASKET CARRIER FOR BICYCLES.
(Application filed Mar. 23, 1898.)
(No Model.)
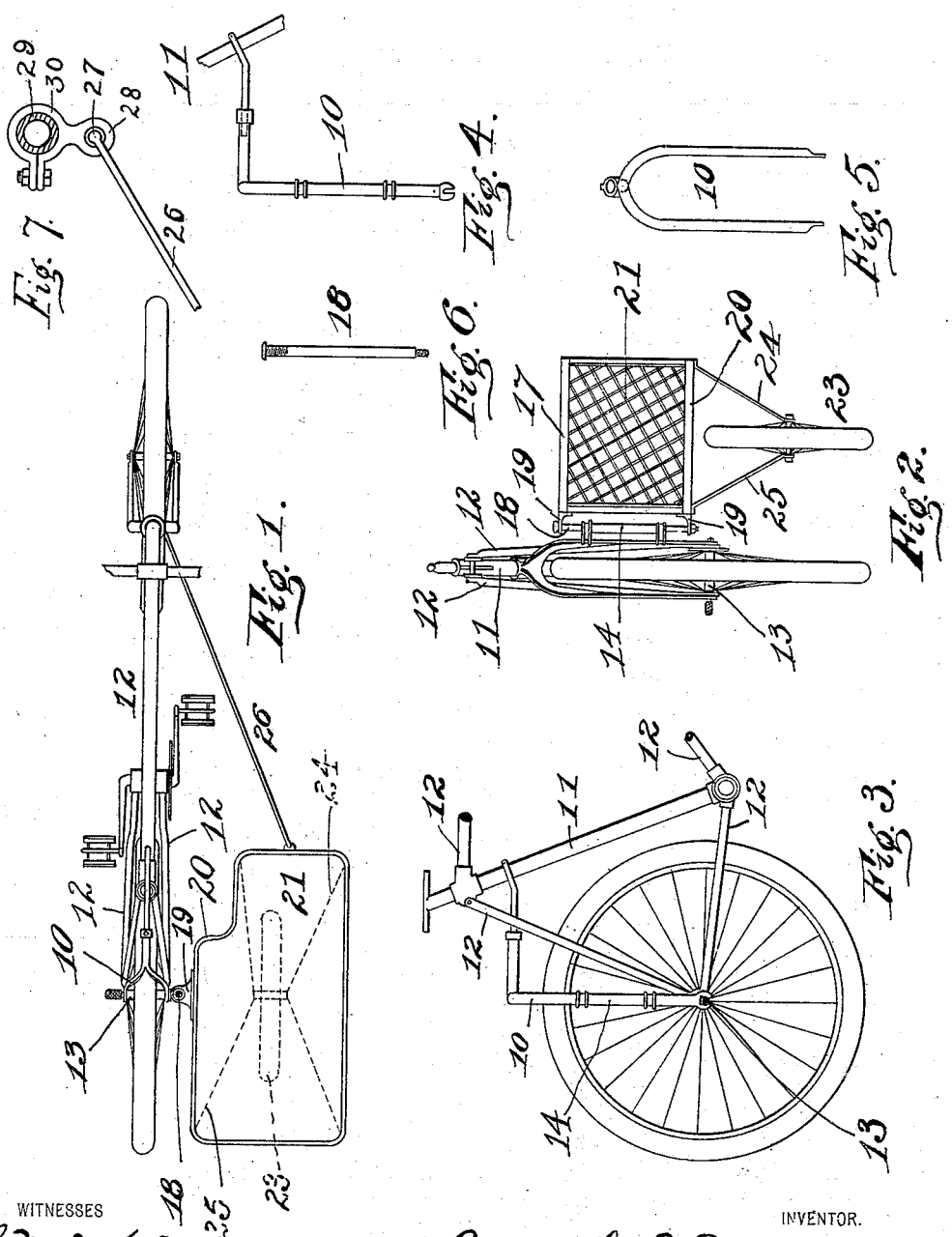
WITNESSES
L. M. Wood
G. P. Baugh
INVENTOR.
Lemuel S. Manning.
BY
ATTORNEYS.

UNITED STATES PATENT OFFICE.

LEMUEL S. MANNING, OF OAKLAND, CALIFORNIA, ASSIGNOR OF ONE-HALF TO W. H. GREGORY, OF SAME PLACE.

BASKET-CARRIER FOR BICYCLES.

SPECIFICATION forming part of Letters Patent No. 648,513, dated May 1, 1900.

Application filed March 23, 1898. Serial No. 674,907. (No model.)

*To all whom it may concern:*

Be it known that I, LEMUEL S. MANNING, a citizen of the United States of America, and a resident of Oakland, in the county of Alameda and State of California, have made a certain new and useful Improvement in Basket-Carriers for Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to attachments for bicycles which will support and carry a basket or other receptacle suitable for carrying parcels, a child, mail-matter, &c., or, if desired, a seat or saddle alongside an ordinary bicycle, the object of the invention being to perform such function without in any manner disturbing the equilibrium of the rider or interfering in the balancing or operation of the bicycle, the details of all of which will be hereinafter fully specified.

In the accompanying drawings, Figure 1 is a plan of the device. Fig. 2 is a rear elevation thereof, and Fig. 3 is a fragmentary side elevation of the back part of the bicycle with the basket and outrider-wheel removed. Fig. 4 is a detail in side elevation of a supplementary rear fork. Fig. 5 is a rear elevation thereof. Fig. 6 is a detail of the sliding rod on the basket. Fig. 7 is a sectional view showing means for connection with the forward portion of the bicycle.

In the figures like reference characters indicate corresponding parts in all the views.

10 is a supplementary frame which is constructed so as to have its body adjustable longitudinally, whereby it may fit any bicycle, the form of adjustment shown being telescopic, and its forward end is provided with a clamp adapted to secure it to the strut 11 of the bicycle-frame 12, said supplementary frame extending backwardly from its point of securement to the said strut to a point substantially over the rear axle 13, where it is bifurcated and extends downwardly, being attached to said axle in some suitable manner.

14 is a guide-tube which is secured to one member of the said supplemental frame in a vertical position, as seen in Fig. 2. Passing through the hole in said guide is a pin 18, Figs. 1 and 2, which should be of greater length than the part 14 and slide vertically therein, as well as be free for axial movement. Carried on this shaft by means of suitable brackets 19 or otherwise, as desired, are the frames 17 and 20, forming the upper and lower end frames, respectively, of the basket 21 and being, if desired, held rigid in their proper relative positions by vertical corner-strips or by the fabric of the basket. Secured to these frames 17 and 20, so as to revolve freely and at such an angle that it will track properly with the wheels of the bicycle, is a wheel 23 of any desired size. This wheel may be journaled and held in any desired manner; but at present it is thought proper to carry the outer end of its axle upon the lower extremity of a bracket 24, secured to the outer side of the frame 20, the other end of its axle being supported by the bracket 25, secured to said inner end of the axle and to the inner edge of the frame 20. It is obvious that this pedestal may be constructed in many different ways; but it should be simple and light. In Fig. 1 the braces 24 and 25 are shown V-shaped, which, it is thought, is preferable, inasmuch as they brace the bicycle against lateral movement.

In order to preserve the proper relative positions of the wheels, I have provided a brace-rod 26, which may, if desired, be made longitudinally adjustable and serves to connect the forward end of the basket with some portion of the running-gear of the bicycle proper, preferably by means of a hook 27, formed on the end of the brace-rod 26 and entering an eye 28 on a clamp 30, which is secured to the steering-head 29.

Having thus described my invention, what I claim as new, and desire to secure by Letters Patent of the United States, is—

1. In a carrier attachment to a bicycle, a carrier mounted on an outrider-wheel, and pivoted on a vertical axis connected with the frame of the bicycle on one side of the rear wheel, and sliding longitudinally on said axis, and a lead-rod pivotally connecting said carrier with the forward end of the frame, substantially as described.

2. In a carrier attachment to a bicycle, a carrier mounted on an outrider-wheel, and having secured on one side thereof a pair of vertically-spaced eyes, a guide-piece secured to the frame of the bicycle on one side of the rear wheel, and likewise having a pair of vertically-spaced eyes, and a bar passed through the four eyes and secured therein, the distance between one pair of eyes being greater than that between the other pair, whereby the carrier has a longitudinal vertical movement relative to the guide-piece, while extending therefrom at a constant angle, and a lead-rod pivotally connecting said carrier with the forward end of the frame, substantially as described.

3. In a carrier attachment to a bicycle, a carrier mounted on an outrider-wheel, a guide-piece secured to the frame of the bicycle on one side of the rear wheel, a connection between the carrier and guide-piece comprising a sleeve secured to one of the connected elements, a pair of eyes secured to the other, and a bar passed through said eyes and sleeve, said eyes being located above and below the ends of the sleeve a sufficient distance to permit of longitudinal movement of the carrier relative to the guide-piece, and a lead-rod pivotally connecting said carrier with the forward end of the frame, substantially as described.

4. In a carrier attachment to a bicycle, a carrier mounted on an outrider-wheel, a supplementary frame consisting of a fork having its ends secured on the ends of the rear axle, and a connection between the top of the fork and the bicycle-frame and carrier, comprising a pair of eyes secured to one of said elements, an elongated bearing between said eyes, connected to the other element, and a bar passed through said eyes and bearing, the eyes being spaced a sufficient distance above and below the ends of the bearing to permit longitudinal movement, and a lead-rod pivotally connecting said carrier to the forward portion of the frame, substantially as described.

5. In a basket-carrier for bicycles, a supplementary frame secured to the frame-strut and to the rear axle, a socket carried on one member thereof in substantially a vertical position, a bar set slidably therein, a basket secured to said bar and an outrider-wheel secured on a V-shaped bracket secured to the said basket, and to the outer end of the axle, and a bar connected with said basket, with the inner end of said axle.

In testimony whereof I hereunto affix my signature in presence of two witnesses.

LEMUEL S. MANNING.

Witnesses:
W. H. GREGORY,
C. G. PERRY.